United States Patent
Kermani

(10) Patent No.: US 12,440,404 B2
(45) Date of Patent: *Oct. 14, 2025

(54) DRIFTING KART

(71) Applicant: Ali Kermani, Huntington Beach, CA (US)

(72) Inventor: Ali Kermani, Huntington Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/009,126

(22) Filed: Jan. 3, 2025

(65) Prior Publication Data

US 2025/0143940 A1 May 8, 2025

Related U.S. Application Data

(63) Continuation of application No. 18/487,323, filed on Oct. 16, 2023, now Pat. No. 12,186,245, which is a
(Continued)

(51) Int. Cl.
| | |
|---|---|
| *A61G 5/10* | (2006.01) |
| *A61G 5/04* | (2013.01) |
| *A63G 25/00* | (2006.01) |
| *B60K 7/00* | (2006.01) |
| *B62B 5/00* | (2006.01) |
| *B62D 9/00* | (2006.01) |

(Continued)

(52) U.S. Cl.
CPC ............ *A61G 5/1051* (2016.11); *A61G 5/047* (2013.01); *A63G 25/00* (2013.01); *B60K 7/0007* (2013.01); *B62B 5/0026* (2013.01); *B62D 9/00* (2013.01); *B62D 17/00* (2013.01); *B62D 21/183* (2013.01); *B62D 39/00* (2013.01); *B62D 61/08* (2013.01); *B62D 63/02* (2013.01); *B62K 5/025* (2013.01)

(58) Field of Classification Search
CPC .. B62D 61/06; B62D 61/08; B60K 2001/006; B60K 7/0007
See application file for complete search history.

(56) References Cited

U.S. PATENT DOCUMENTS

| | | | | | |
|---|---|---|---|---|---|
| 3,700,058 | A | * | 10/1972 | Kuwahara | A63G 25/00 180/21 |
| 3,938,608 | A | * | 2/1976 | Folco-Zambelli | B62B 5/0026 280/47.11 |

(Continued)

*Primary Examiner* — Toan C To
(74) *Attorney, Agent, or Firm* — Knobbe, Martens, Olson & Bear, LLP

(57) ABSTRACT

Drifting karts in accordance with embodiments of the invention are described that include a front wheel drive train and rear caster wheels that can be dynamically engaged to induce and control drift during a turn. One embodiment of the invention includes a chassis to which a steering column is mounted, where the steering column includes at least one front steerable wheel configured to be driven by an electric motor, a battery housing mounted to the chassis, where the battery housing contains a controller and at least one battery, wiring configured to provide power from the at least one battery to the electric motor, two caster wheels mounted to the chassis, where each caster wheel is configured to rotate around a rotational axis and swivel around a swivel axis, and a hand lever configured to dynamically engage the caster wheels to induce and control drift during a turn.

20 Claims, 12 Drawing Sheets

Related U.S. Application Data continuation of application No. 17/815,118, filed on Jul. 26, 2022, now Pat. No. 11,786,423, which is a continuation of application No. 17/466,580, filed on Sep. 3, 2021, now Pat. No. 11,903,886, which is a continuation of application No. 16/366,557, filed on Mar. 27, 2019, now Pat. No. 11,110,016, which is a continuation of application No. 16/112,469, filed on Aug. 24, 2018, now Pat. No. 10,245,194, which is a continuation of application No. 15/352,343, filed on Nov. 15, 2016, now abandoned, which is a continuation of application No. 14/821,491, filed on Aug. 7, 2015, now Pat. No. 9,499,220, which is a continuation of application No. 14/531,840, filed on Nov. 3, 2014, now Pat. No. 9,102,375, which is a continuation of application No. 13/745,648, filed on Jan. 18, 2013, now Pat. No. 8,875,831, which is a continuation of application No. 12/888,672, filed on Sep. 23, 2010, now Pat. No. 8,356,686, which is a continuation of application No. 12/505,955, filed on Jul. 20, 2009, now Pat. No. 7,823,675.

(60) Provisional application No. 61/082,014, filed on Jul. 18, 2008.

(51) Int. Cl.
- *B62D 17/00* (2006.01)
- *B62D 21/18* (2006.01)
- *B62D 39/00* (2006.01)
- *B62D 61/08* (2006.01)
- *B62D 63/02* (2006.01)
- *B62K 5/025* (2013.01)

(56) References Cited

U.S. PATENT DOCUMENTS

| | | | | |
|---|---|---|---|---|
| 4,403,673 | A * | 9/1983 | Ball | A61G 5/10 280/62 |
| 5,494,126 | A * | 2/1996 | Meeker | A61G 5/047 180/907 |
| 5,826,670 | A * | 10/1998 | Nan | A61G 5/1051 180/211 |
| 6,766,871 | B2 * | 7/2004 | Sawyer | A61G 5/047 180/211 |
| 7,117,967 | B2 * | 10/2006 | Kidd | A61G 5/1051 180/209 |
| 7,823,675 | B2 * | 11/2010 | Kermani | B62K 5/025 180/211 |
| 8,262,117 | B2 * | 9/2012 | Knopf | A61G 5/1062 280/291 |
| 8,356,686 | B2 * | 1/2013 | Kermani | A63G 25/00 180/211 |
| 8,875,831 | B2 * | 11/2014 | Kermani | A61G 5/1051 180/211 |
| 9,102,375 | B2 * | 8/2015 | Kermani | B62K 5/025 |
| 9,499,220 | B2 * | 11/2016 | Kermani | B62D 39/00 |
| 10,245,194 | B2 * | 4/2019 | Kermani | B62D 17/00 |
| 11,110,016 | B2 * | 9/2021 | Kermani | B62D 39/00 |
| D1,048,951 | S | 10/2024 | Chen | |
| D1,048,952 | S | 10/2024 | Kermani | |
| D1,049,248 | S | 10/2024 | Chen | |
| D1,063,715 | S | 2/2025 | Kermani | |
| 2024/0409169 | A1 | 12/2024 | Kerman et al. | |
| 2025/0042237 | A1 | 2/2025 | Chen et al. | |

\* cited by examiner

DRIFTING KART

RELATED APPLICATIONS

Certain related applications are listed in an application data sheet (ADS) filed with this application. The entirety of each of the applications listed in the ADS is hereby incorporated by reference herein.

BACKGROUND OF THE INVENTION

Field of the Invention

The present invention relates to the field of motorized vehicles and, more specifically, to a kart type vehicle used for racing, and recreational entertainment.

Karting or kart racing is a popular open-wheeled motor sport with simple, small four wheeled vehicles called karts, go-karts, or gearbox/shifter karts depending on the design. Karts vary widely in speed and can reach speeds exceeding 160 miles per hour, while karts intended for the general public may be limited to speeds of no more than 15 miles per hour. 2-stroke or 4-stroke engines are typically used to power karts. However, a number of karts are powered by electric motors including DC electric motors.

Karts are typically rear wheel drive and are steered using the front wheels of the kart. Karts generally lack suspension so that the chassis of the Kart absorbs much of the vibration experienced during motion. The Kart chassis is designed to be flexible enough to work as a suspension and stiff enough not to break or give way during a turn. The chassis is commonly constructed from hollow tubes. For stability the driver of a kart is typically seated as low to the ground as possible. Lowering the height of the combined center of mass of the driver and kart reduces the likelihood that the kart will roll during a high speed maneuver.

Karts typically do not have a differential. The lack of a differential means that one rear tire must slide while cornering. Sliding can be achieved by designing the chassis so that the inside rear tire lifts up slightly when the kart turns the corner. This allows the tire to lose some of its grip and slide or lift off the ground completely.

Drifting refers to a driving technique and to a motor sport where the driver intentionally oversteers, causing loss of traction in the rear wheels through turns, while preserving vehicle control and a high exit speed. A vehicle is said to be drifting when the rear slip angle is greater than the front slip angle prior to the corner apex, and the front wheels are pointing in the opposite direction to the turn, and the driver is controlling those factors. Techniques for inducing drift include a hand brake drift. During a hand brake drift, the hand brake lever is used to stop the rear wheels, upsetting their grip and causing them to drift.

Drifting has become a competitive sport where drivers compete in rear wheel drive cars, and occasionally all wheel drive cars, to earn points from judges based on various factors including line, angle, speed and show factor. Line involves taking the correct line, which is usually announced beforehand by judges. The show factor is based on multiple things, such as the amount of smoke, how close the car is to the wall, and the crowd's reaction. Angle is the angle of a car in a drift, speed is the speed entering a turn, the speed through a turn, and the speed exiting the turn. Drift cars are typically light to moderate weight rear wheel drive coupes and sedans ranging from 200-1000 bhp. In almost all instances, drift cars include a mechanical limited slip differential.

SUMMARY OF THE INVENTION

Drifting karts in accordance with embodiments of the invention include a front wheel drive train and rear caster wheels that can be dynamically engaged to induce and control drift during a turn. One embodiment of the invention includes a chassis to which a steering column is mounted, where the steering column includes at least one front steerable wheel configured to be driven by an electric motor, a battery housing mounted to the chassis, where the battery housing contains a controller and at least one battery, wiring configured to provide power from the at least one battery to the electric motor, two caster wheels mounted to the chassis, where each caster wheel is configured to rotate around a rotational axis and swivel around a swivel axis, and a hand lever configured to dynamically engage the caster wheels to induce and control drift during a turn.

In a further embodiment, the two caster wheels are mounted to the chassis via a rotatable member that is connected to the hand lever, and rotation of the hand lever rotates the caster wheels from a first position where the caster wheels are aligned so that the weight on the caster wheels limits the ability of the caster wheels to swivel about their swivel axes, to a second position where the caster wheels are aligned so that they are free to swivel about their swivel axes.

In another embodiment, the steerable wheel is mounted to a zero camber zero rake fork.

In a still further embodiment, the steering column is configured to rotate through 360 degrees.

In still another embodiment, each caster wheel is configured to rotate 360 degrees around its rotational axis.

In a yet further embodiment, the electric motor is a variable speed electric motor, and the power delivered to the variable speed electric motor is controlled by an acceleration pedal.

Yet another embodiment also includes a seat mounted to the chassis and positioned in front of the battery housing.

In a further embodiment again, the seat is mounted to the chassis so that a steering wheel fixed to the steering column and the hand lever are within reach of a driver seated in the seat and so that the driver is seated low to the ground.

Another embodiment again also includes a pair of fixed wheels connected via an axle. In addition, the hand lever is configured to raise and lower the pair of fixed wheels and the casters are mounted to the chassis and the hand lever engages the caster wheels by raising the fixed wheels.

In a further additional embodiment again, the fork is a zero camber zero rake fork.

In another additional embodiment again, the steering column is configured to rotate through 360 degrees.

In a still yet further embodiment, each caster wheel is configured to rotate 360 degrees around its rotational axis.

In still yet another embodiment, the electric motor is a variable speed electric motor, and the power delivered to the variable speed electric motor is controlled by an acceleration pedal.

A still further embodiment again also includes a seat mounted to the chassis and positioned in front of the battery housing.

In still another embodiment again, the seat is mounted to the chassis so that a steering wheel fixed to the steering column and the hand lever are within reach of a driver seated in the seat and so that the driver is seated low to the ground.

Another further embodiment includes a hollow tube chassis to which a steering column is mounted, where the steering column includes at least one front steerable wheel mounted to a zero camber zero rake fork that is configured to rotate through 360 degrees and where the at least one steerable wheel is configured to be driven by a variable speed electric motor, a battery housing mounted to the chassis, where the battery housing contains a controller and at least one battery, wiring configured to provide power from the at least one battery to the variable speed electric motor, an acceleration pedal connected to a throttle that controls the power delivered by the at least one battery to the variable speed electric motor, two caster wheels mounted to the chassis via a rotatable member, where each caster wheel is configured to rotate 360 degrees around a rotational axis and swivel 360 degrees around a swivel axis, a hand lever connected to the rotatable member, where rotation of the hand lever dynamically engages the caster wheels to induce and control drift during a turn by rotating the caster wheels from a first position where the caster wheels are aligned so that the weight on the caster wheels limits the ability of the caster wheels to swivel about their swivel axes, to a second position where the caster wheels are aligned so that they are free to swivel about their swivel axes, and a seat mounted to the chassis and positioned in front of the battery housing so that a steering wheel fixed to the steering column and the hand lever are within reach of a driver seated in the seat and so that the driver is seated low to the ground.

DETAILED DESCRIPTION OF THE PREFERRED EMBODIMENTS

Figure 1:
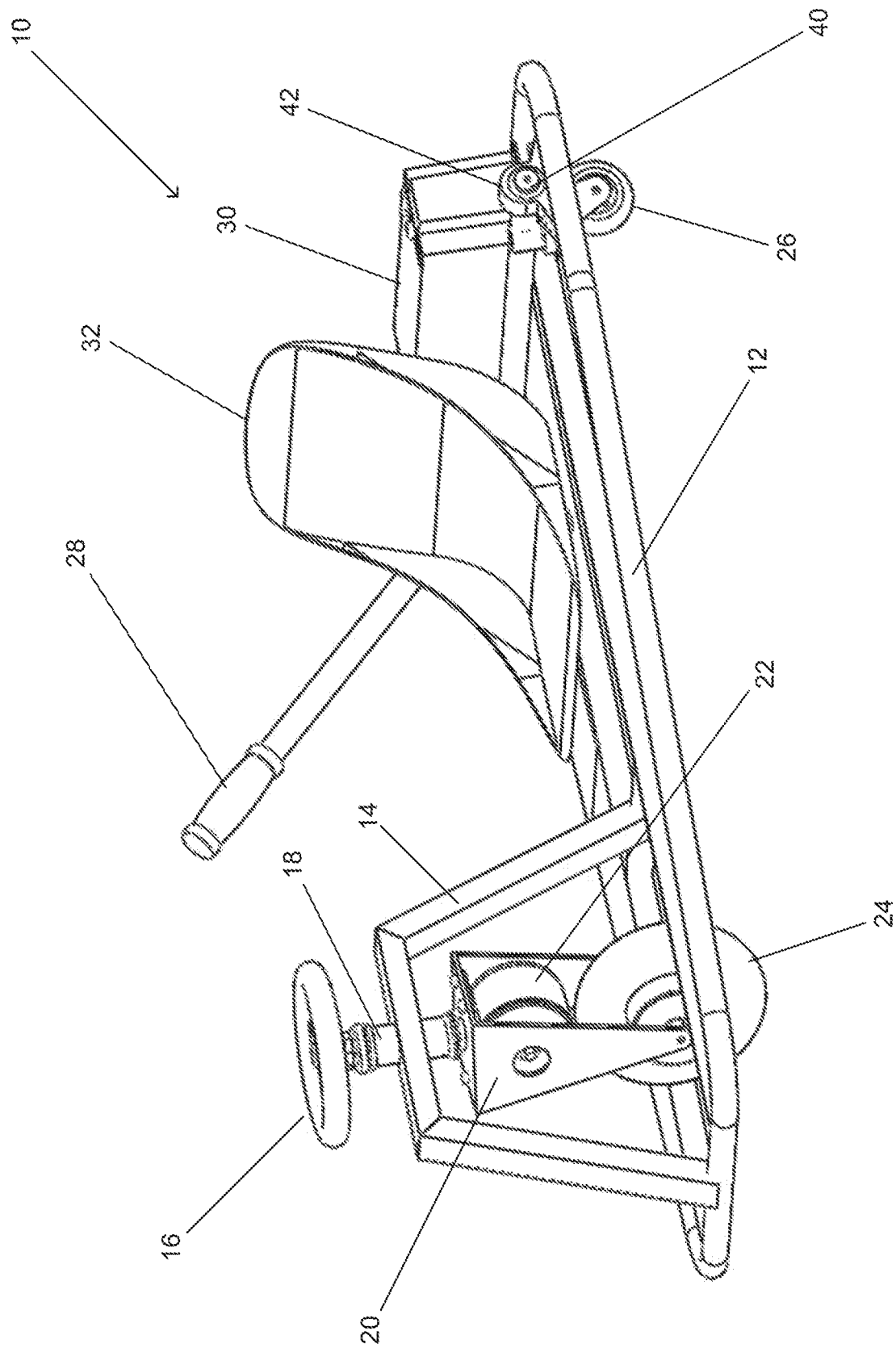
FIG. 1 is a raised-angle right-side perspective view of a drifting kart in accordance with an embodiment of the invention.

Turning now to the drawings, drifting karts that are front wheel drive and include rear caster wheels that can be dynamically engaged to induce and control drift during a turn in accordance with embodiments of the invention are illustrated. A caster wheel typically includes a wheel configured to rotate around a rotational axis and a fork supporting the wheel, which enables the wheel to swivel around a swivel axis. When the caster wheels of the drifting kart contact a track surface and the caster wheels are free to swivel around their swivel axes, the caster wheels are considered "engaged" and the kart can be steered into a drift. The caster wheels can be "disengaged" to steer the kart normally by either limiting the extent to which the caster wheels can swivel or by shifting the caster wheels so that they do not contact the track surface.

In a number of embodiments, a hand lever controls the engagement of the caster wheels and can be used by a driver to induce and control drift during a turn. Pulling on the hand lever simulates a hand brake drifting technique used to initiate drift in a rear wheel drive automobile with a limited slip differential. In many embodiments, the caster wheels are mounted to a rotatable member and the hand lever rotates the rotatable member from a first position, where the caster wheels are aligned so that the weight of the drifting kart and/or the driver limits the ability of the caster wheels to swivel about their swivel axes, to a second position where the caster wheels are aligned so that they are free to swivel about their swivel axes during motion of the drifting kart.

In several embodiments, the drifting kart includes an additional pair of rear wheels fixed to an axle and the hand lever is configured to raise and lower the fixed wheels so that the caster wheels do not engage the track in the lowered position, and the caster wheels engage the track in the raised position.

In many embodiments, a zero camber zero rake fork houses the power train. The power train can be a variable speed electric motor that delivers power to a drive wheel using a chain and sprocket system or belt. In several embodiments, the zero camber zero rake fork enables the front drive wheel to rotate through 360 degrees. In a number of embodiments, the alignment of the fork that houses the power train is aligned at an angle to vertical that is sufficiently small such that the weight of the drifting kart and the driver does not prevent the full 360 degree steering of the drive wheel. In a number of embodiments, full 360 degree drift is not desired and the fork can be aligned at a greater angle to vertical.

Referring now to FIGS. 1-6b, views of a drifting kart in accordance with an embodiment of the invention are illustrated. The drifting kart 10 includes a chassis 12, which is typically constructed from hollow tubing that is sufficiently flexible to provide suspension and sufficiently rigid to hold together during driving. A steering mount 14 is attached to the chassis and the steering mount supports the steering assembly and the drive train. In the illustrated embodiment, the steering assembly includes a steering wheel 16 attached to a steering column 18 that is configured to rotate a fork 20. The fork 20 contains the power train, which includes an electric motor 22 that is configured to drive a steerable wheel 24. In a number of embodiments, the electric motor 22 is a variable speed DC electric motor that drives the steerable wheel 24 using a chain and sprockets. In several embodiments, the electric motor 22 drives the steerable wheel 24 using a belt. In many instances, the electric motor is a 250 W variable speed electric motor. In other embodiments, any of a variety of electric and/or gasoline motors can be used to power a drifting kart in accordance with embodiments of the invention. Although a single steerable wheel is shown in FIGS. 1-6b, two or more steerable wheels can be included in the drive train. In a number of embodiments, the two or more wheels are aligned to enable steering through 360 degrees.

In several embodiments, the fork is a zero camber zero rake fork that enables the steering wheel to turn through 360 degrees. The ability to turn the steering wheel through 360 degrees and the ability to induce drift during the rotation of the steering wheel can provide the drifting kart with a zero turn radius allowing a driver to induce and control drift that spins the drifting kart through 360 degrees. The vertical alignment of such a fork means that the chassis of the drifting kart is not raised as the fork is rotated through 360 degrees on a level surface. The extent to which the steering column can be aligned at an angle to vertical depends largely upon the weight of the drifting cart, the weight of the driver, and the amount of force the driver can exert on the steering wheel during its turning through 360 degrees. Accordingly, many embodiments utilize forks aligned in accordance with the requirements of a specific application.

Figure 3A:
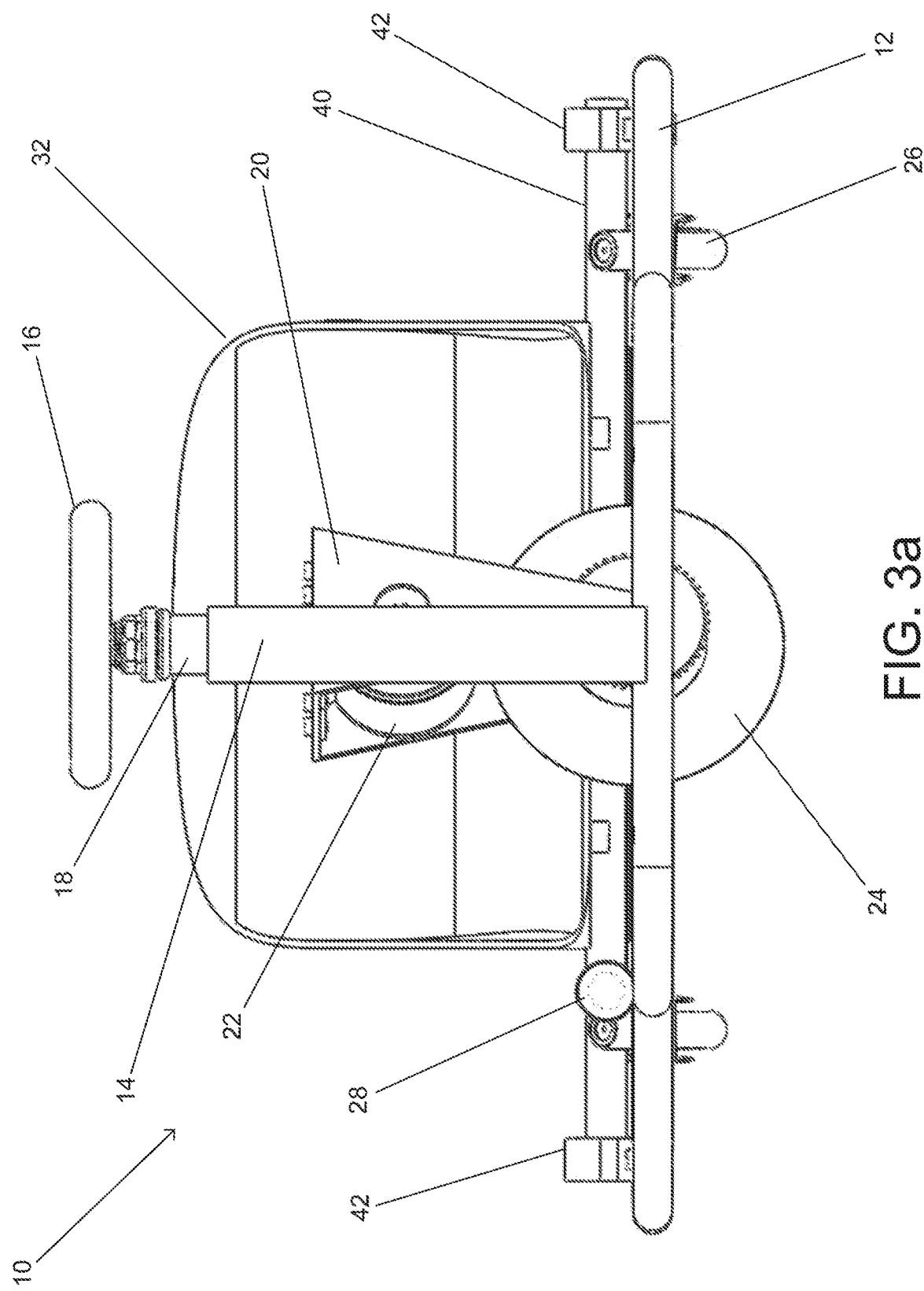
FIGS. 3a and 3b are front views of a drifting kart showing the change in alignment of a pair of caster wheels caused by rotation of a hand lever in accordance with an embodiment of the invention.
Figure 3B:
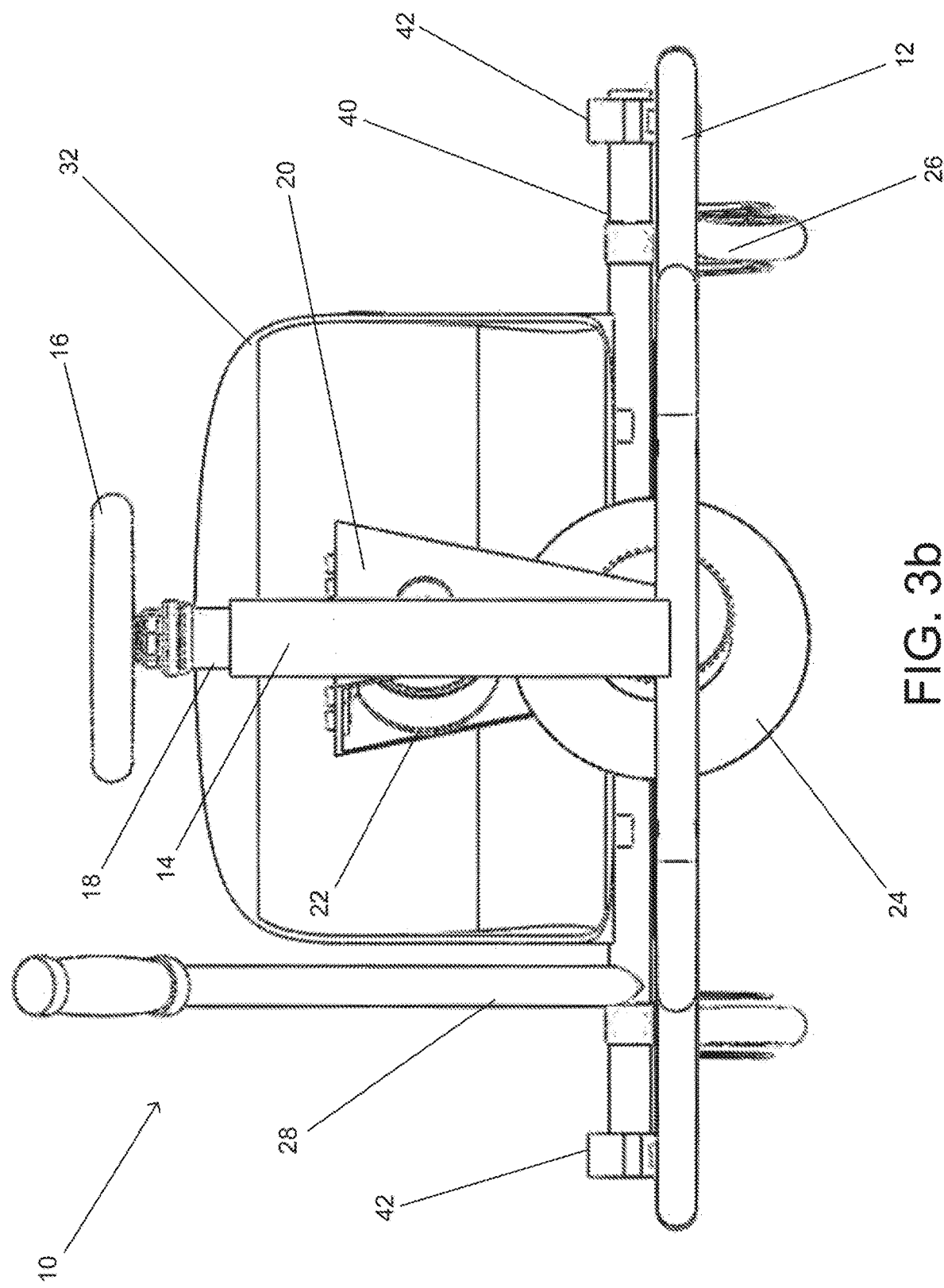
Figure 4A:
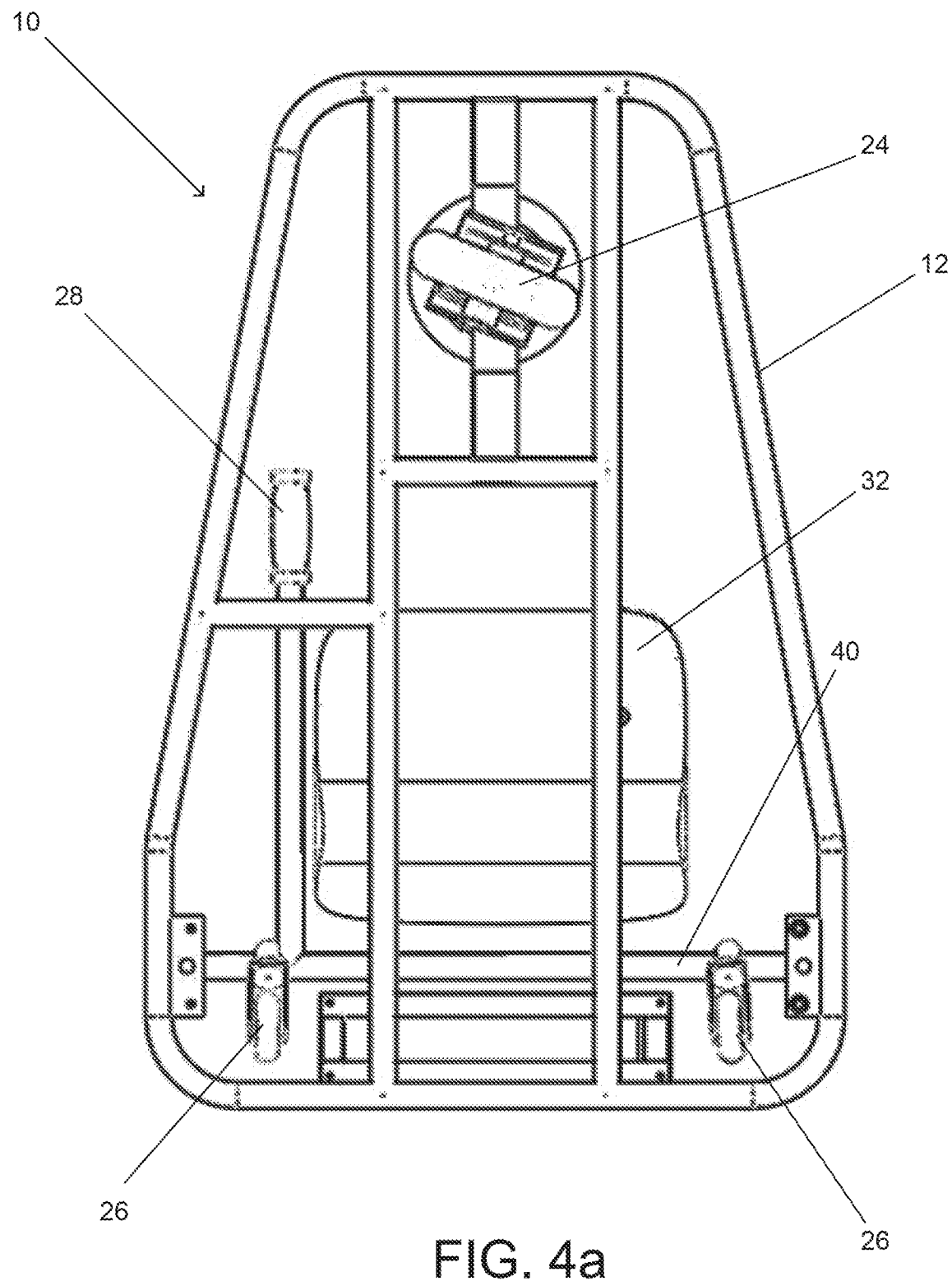
FIGS. 4a and 4b are views from below of a drifting kart showing the change in alignment of a pair of caster wheels caused by rotation of a hand lever in accordance with an embodiment of the invention.
Figure 4B:
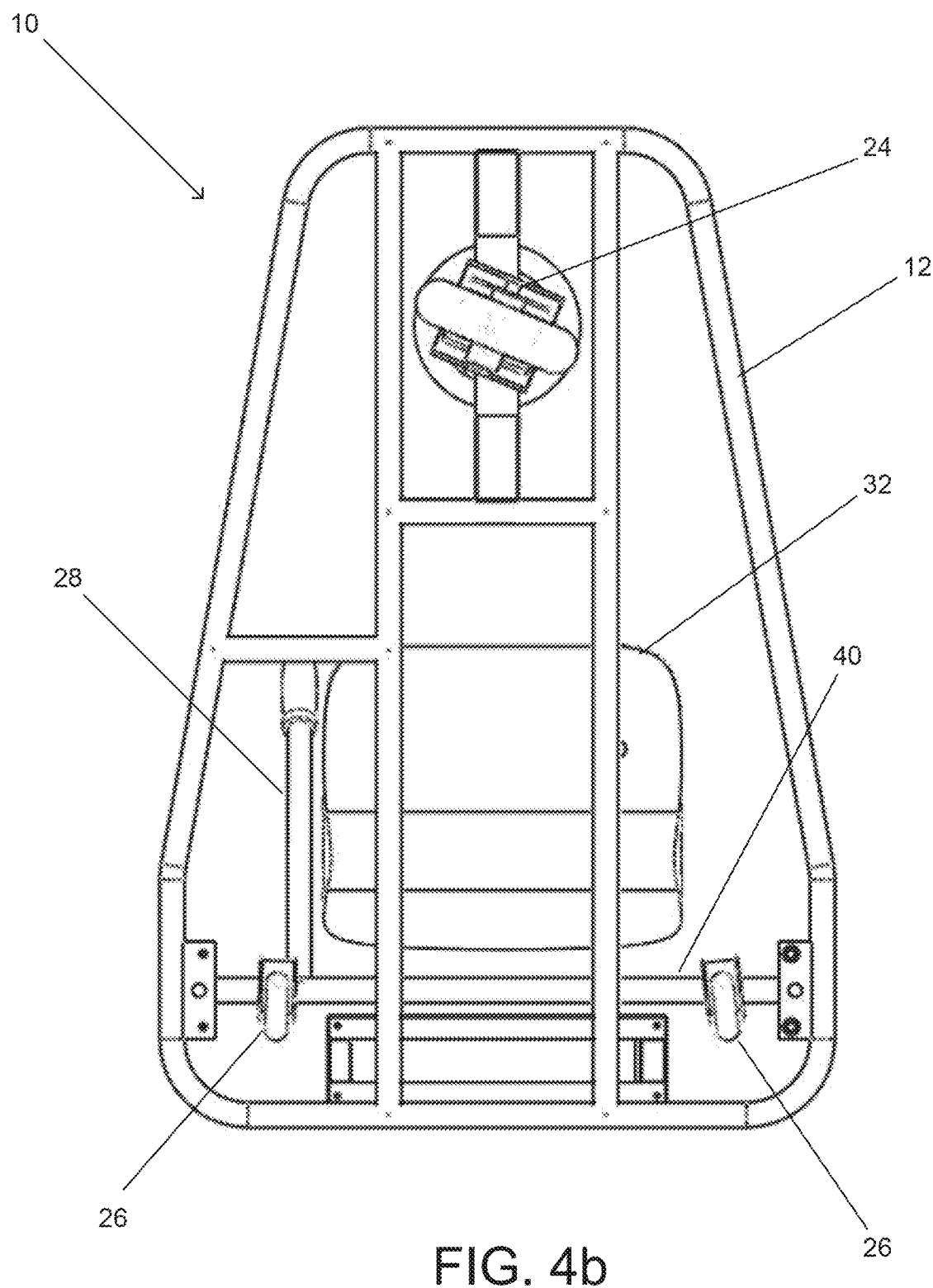
Figure 5A:
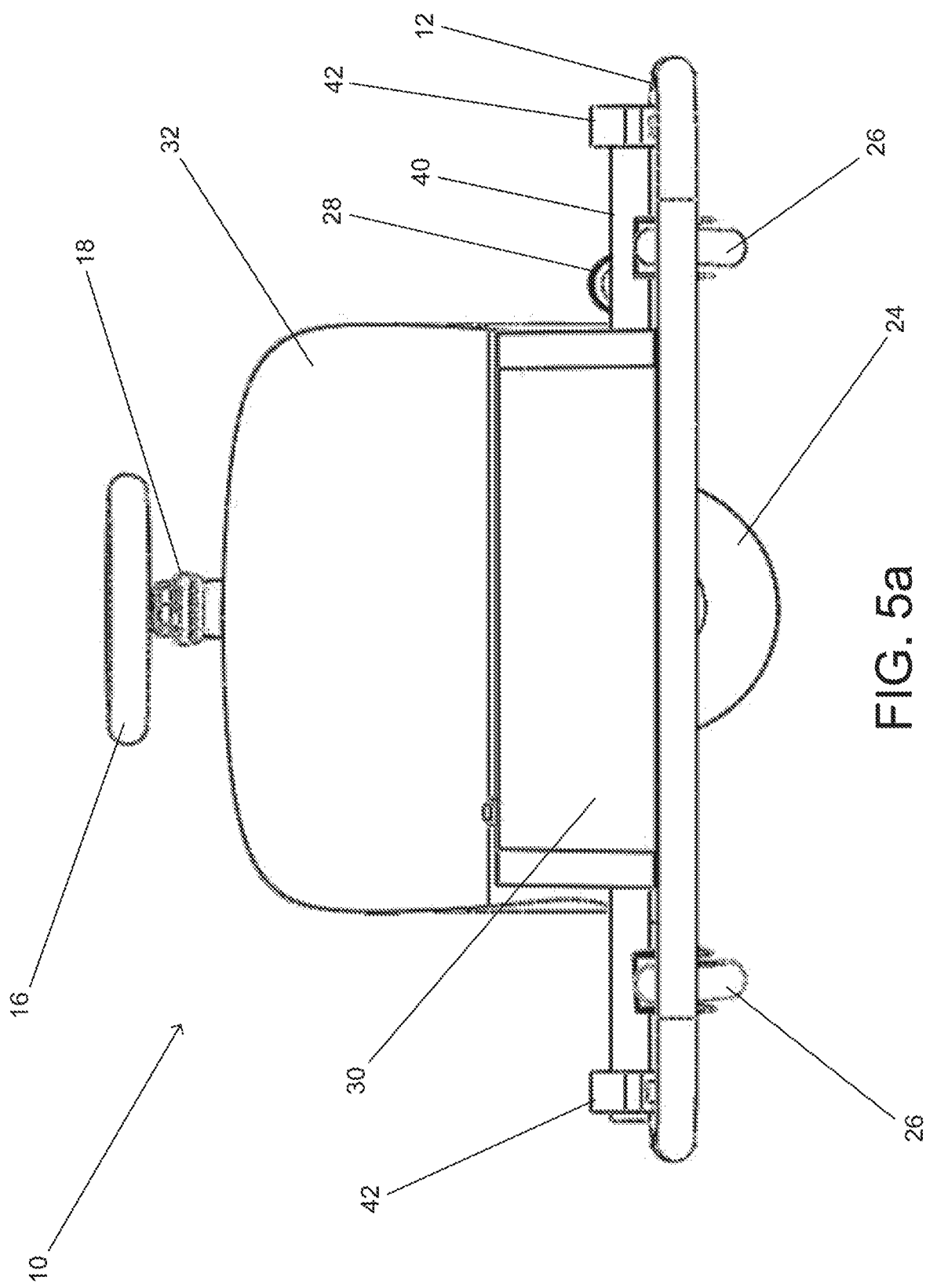
FIGS. 5a and 5b are rear views of a drifting kart showing the change in alignment of a pair of caster wheels caused by rotation of a hand lever in accordance with an embodiment of the invention.
Figure 5B:
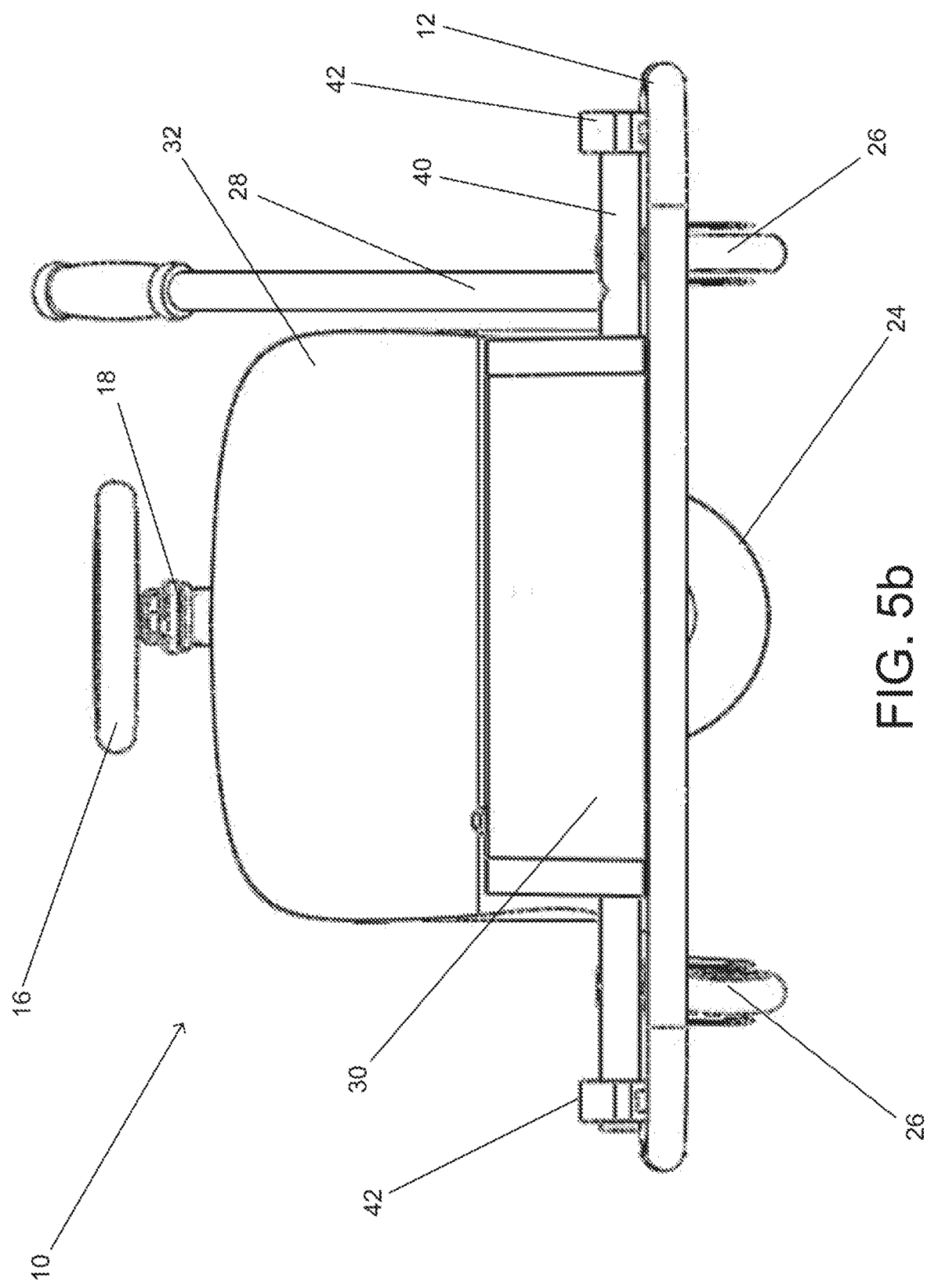
Figure 6A:
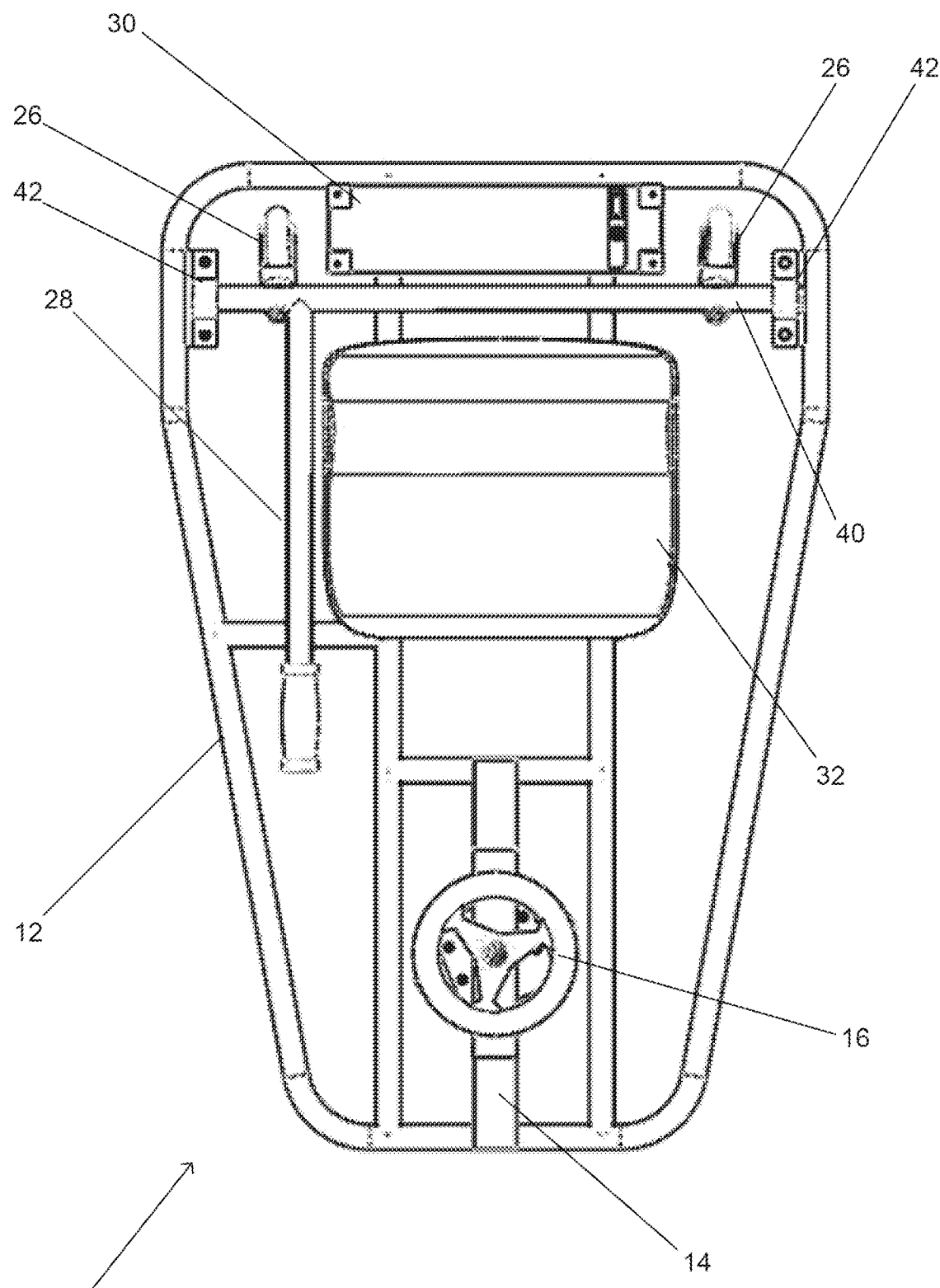
FIGS. 6a and 6b are top views of a drifting kart showing the change in alignment of a pair of caster wheels caused by rotation of a hand lever in accordance with an embodiment of the invention.
Figure 6B:
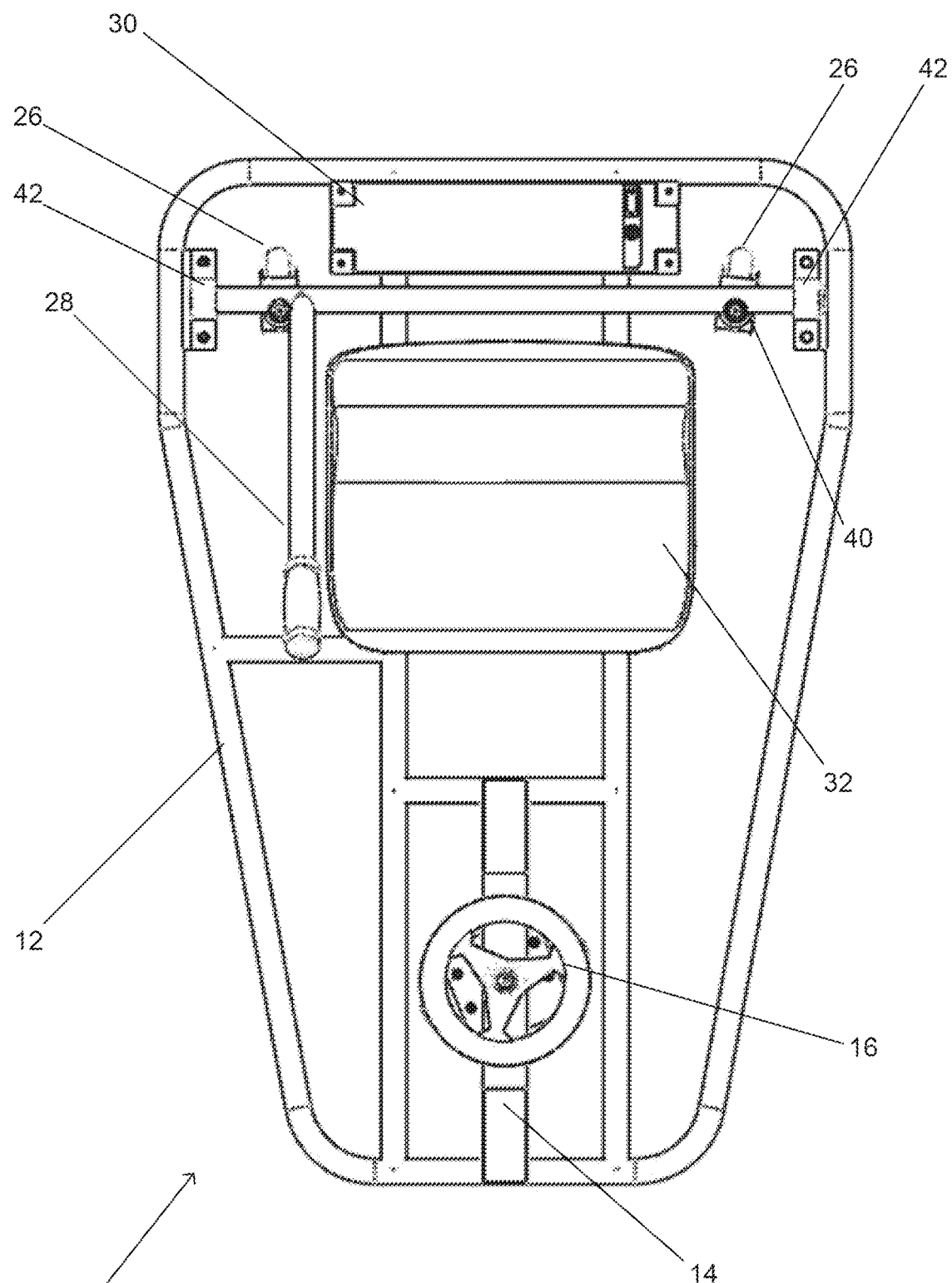

Referring now to FIGS. 3a and 3b, the drifting kart is shown as resting on a pair of rear caster wheels 26. The rear caster wheels are mounted to a rotatable member 40 that is mounted to the chassis 12 using a pair of brackets 42. In the illustrated embodiment, the rotatable member is a hollow tube. In other embodiments, the rotatable member can be constructed from materials appropriate to the application. A hand lever 28, which can be referred to as a "whammy bar", is connected to the rotatable member 40. When the hand lever is lowered, the swivel axes of the rear caster wheels are aligned at a sufficiently large angle to vertical that the weight of the drifting kart and/or the driver limits the ability of the caster wheels to swivel around their swivel axes. Pulling upward on the hand lever 28 rotates the rotatable member 40. The rotation of the rotatable member 40 rotates the caster wheels under the chassis of the drifting kart and reduces the angles between the swivel axes of the caster wheels and vertical. Reducing the angles between the swivel axes of the caster wheels and vertical (i.e., the rake) enables the caster wheels to rotate more freely around the swivel axis. In this way, the hand lever can be used to engage the caster wheels and induce and control the amount of drift during a turn. The amount of drift that is allowed is determined by the angle of the caster wheels. Due to the relationship between the rotatable member and the hand lever, the angle of the caster wheels is controlled by the degree to which the rider lifts the hand lever. In one embodiment, the swivel axis of the caster wheels can rotate between a rake of 33 degrees and 0 degrees to vertical to control the amount of drift that is allowed. In other embodiments, the extent to which the swivel axis of the caster wheels can rotate relative to vertical is determined by the amount of drift desired in the specific application.

Figure 2A:
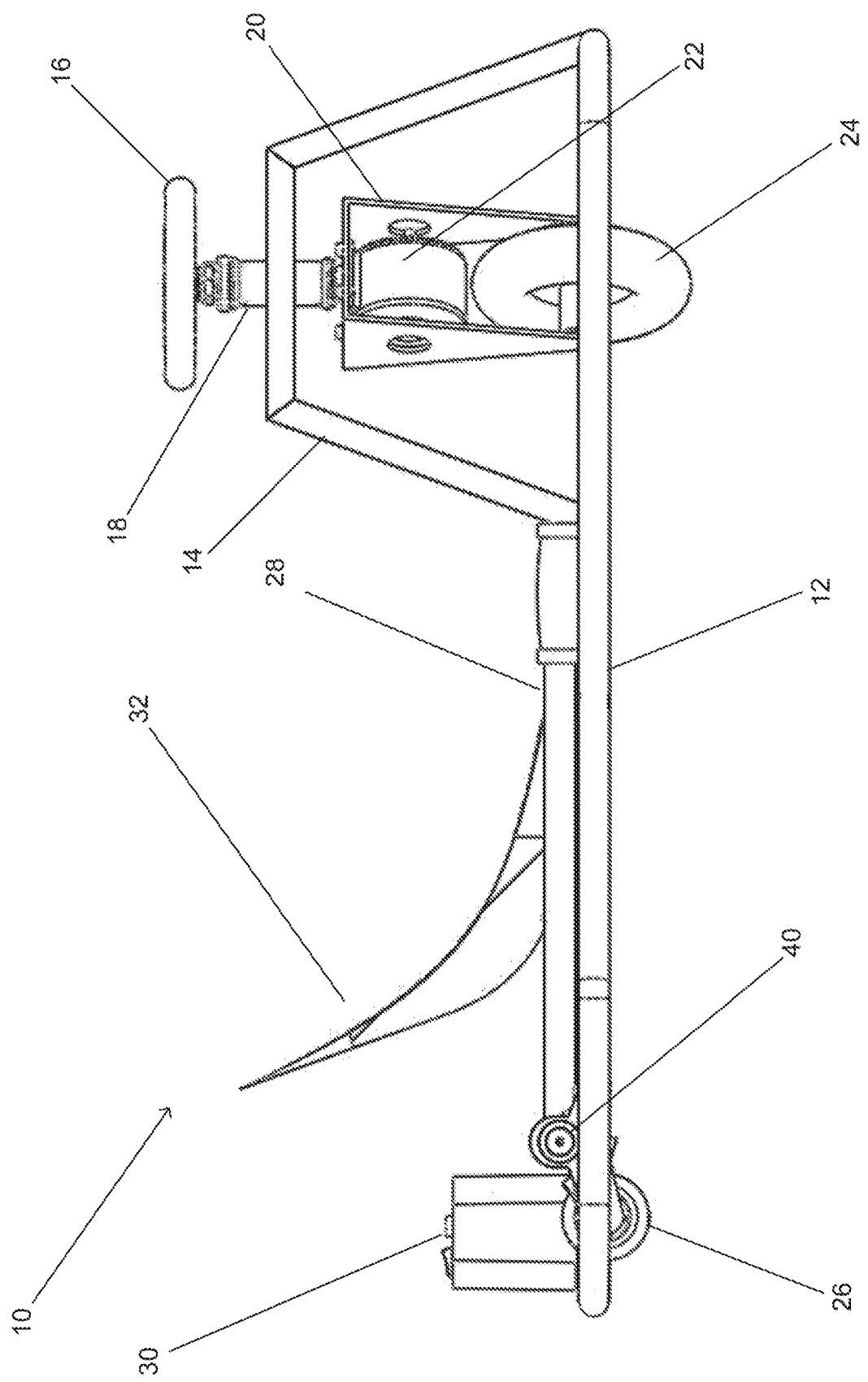
FIGS. 2a and 2b are left side views of a drifting kart showing the change in alignment of a pair of caster wheels caused by rotation of a hand lever in accordance with an embodiment of the invention.
Figure 2B:
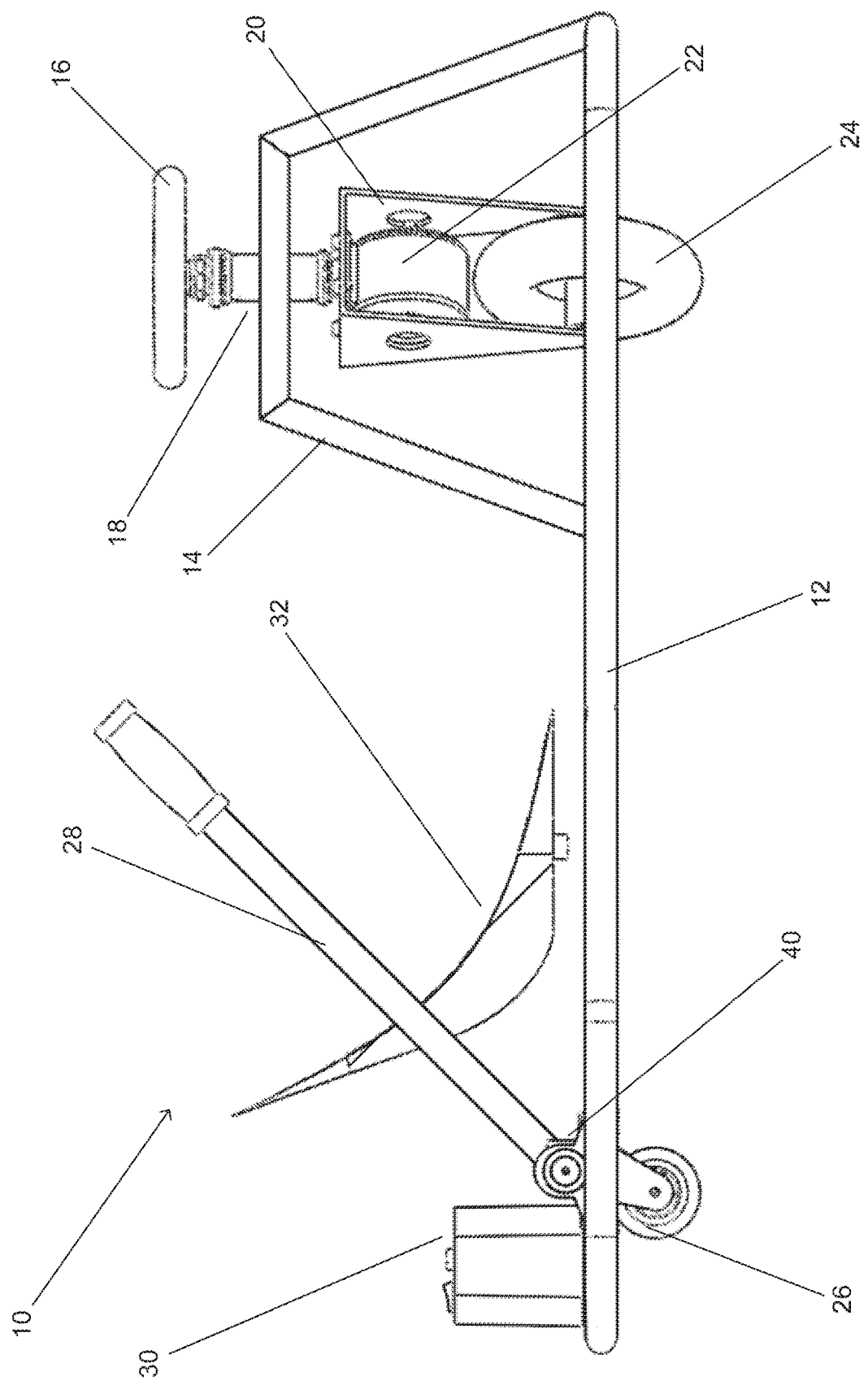

Referring now to FIGS. 2a, 3a, 4a, 5a, and 6a, the drifting kart is shown with the hand lever lowered. As can be readily observed in FIG. 2a, the swivel axis of the caster wheel 26 is at an angle to vertical and has a significant component in the direction of the forward motion of the drifting kart. Turning now to FIG. 2b, the drifting kart is shown with the hand lever raised. The swivel axis of the caster wheel 26 is rotated relative to the position shown in FIG. 2a and the caster wheel is free to rotate around its swivel axis.

The caster wheels used in the construction of drifting karts in accordance with embodiments of the invention are typically constructed from high performance casters that include polyurethane wheels mounted to the caster fork via at least one bearing press fitted to the wheel. In one embodiment, the wheels have a 68 mm radius and the bearings are BSB ABEC 7 bearings. Although other casters appropriate to the application can also be used.

Power is provided to the power train via a battery housing 30 that contains batteries and a controller. The batteries are typically rechargeable and employ a recharging system that is configured to draw power from a conventional single phase power outlet. In many embodiments, the batteries form a 24 V battery system utilizing two 12 V 7 Amp Hour batteries and the controller regulates the supply of electricity to the electrical systems of the drifting kart. In other embodiments, batteries and controls are utilized as necessary for a specific application. In many embodiments, the battery housing provides a switch for powering the vehicle on or off, as well as a charger port connection for recharging the batteries. The power generated by the batteries is channeled to the electric motor, which is typically a variable speed motor, via wires running through the hollow tube chassis of the drifting kart.

In a number of embodiments, an acceleration pedal (not shown, but typically provided as a foot pedal) connects to a twist throttle accelerator that controls the power delivered to a variable speed electric motor in the power train. The twist throttle accelerator can be located at the rear of the drifting kart adjacent the battery housing. The amount of battery power channeled to the electric motor can be proportionate to how far the acceleration pedal is depressed. The acceleration pedal can be implemented using a lever similar to a bicycle brake lever and a bicycle break cable. In other embodiments, the acceleration pedal is implemented using a pedal mechanism and cables, and/or a variety of techniques are used to control the power delivered to the steerable wheel by the drive train.

A seat 32 for the driver is also mounted to the chassis. The seat is typically positioned so that the driver is readily able to rotate the steering wheel and pull upward on the hand lever from a comfortable driving position. For stability, the seat is typically fixed to the chassis as low to the ground as possible. The higher the seat the greater the likelihood that shifting weight will cause the drifting kart to roll during cornering. In a number of embodiments, the seat 32 is located in front of the battery housing 30. In other embodiments, the battery housing is located in accordance with the requirements of the application.

Figure 7:
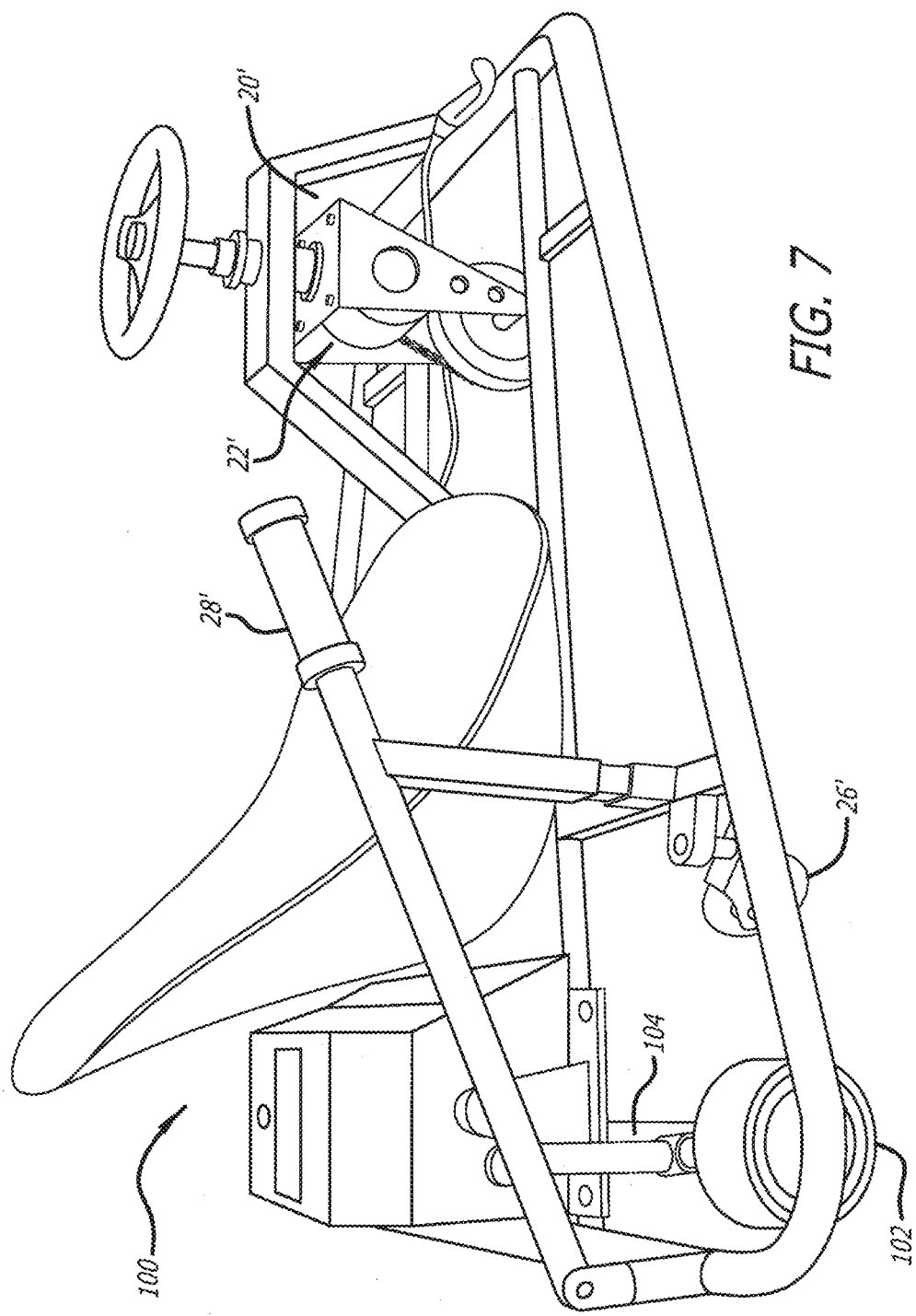
FIG. 7 is a raised-angle left-side perspective view of a drifting kart including a pair of rear wheels fixed to an axle and a pair of rear caster wheels, where the rear fixed wheels can be raised and lowered using a hand lever, in accordance with an embodiment of the invention.

Referring back to the caster wheels 26 in FIGS. 1-6b, a rotatable member is used to engage the rear caster wheels 26. In other embodiments, a variety of techniques are used to dynamically engage the rear caster wheels to induce and control drift during a turn. Turning now to FIG. 7 a drifting kart in accordance with an embodiment is illustrated. The drifting kart 100 shown in FIG. 7 is similar to the drifting kart 10 shown in FIGS. 1-6b with the exception that the drifting kart 100 includes an additional set of fixed rear wheels 102 connected via an axle 104. In the illustrated embodiment, the hand lever 28' enables the raising and lowering of the fixed rear wheels 102 and the rear caster wheels 26' are engaged by using the hand lever 28' to raise the fixed rear wheels. Raising the fixed rear wheels 102 places the rear caster wheels 26' in contact with the track beneath the drifting kart. In this way, the hand lever can be used to engage the rear caster wheels and induce and control drift during a turn. Although the fixed rear wheels are raised and lowered in the embodiment illustrated in FIG. 7, drifting karts in accordance with embodiments of the invention can utilize rear caster wheels that can be raised and lowered. In embodiments where the rear caster wheels are raised and lowered using a "whammy bar" mechanism similar to that shown in FIGS. 1-6b that raises and lowers the caster wheels by rotating them under the chassis, the "whammy bar" can be used to dynamically engage the caster wheels to induce and control drift during a turn.

Although use of the "whammy bar" mechanism described above is discussed with reference to drifting karts, similar mechanisms involving modifying the rake of one or more caster wheels to control the extent to which the caster wheel can swivel around its swivel axis can be utilized in a variety of other powered and non-powered vehicles and/or devices. When incorporated into a device, the "whammy bar" mechanism typically involves at least one caster wheel mounted to a rotatable member that can be rotated using a lever to control the rake of the caster wheel.

While the above description contains many specific embodiments of the invention, these should not be construed as limitations on the scope of the invention, but rather as an example of one embodiment thereof. For example, other mechanisms can be used to dynamically engage caster wheels and induce and control drift during a turn including but not limited to mechanisms that mechanically and controllably limit the ability of the caster wheels to swivel around their swivel axes. Accordingly, the scope of the invention should be determined not by the embodiments illustrated, but by the appended claims and their equivalents.

What is claimed is:

1. A drifting kart comprising:
a chassis;
a seat mounted to the chassis;
a steering mount mounted to the chassis, the steering mount comprising a front steerable wheel and an electric motor configured to drive the front steerable wheel;
a battery configured to provide electric power to the electric motor;
a first caster wheel and a second caster wheel mounted to the chassis, the first and second caster wheels configured to rotate around a respective rotational axis and swivel around a respective swivel axis; and
a hand lever configured to engage the first and second caster wheels to induce drifting of the drifting kart.

2. The drifting kart of claim 1, wherein:
the first and second caster wheels are mounted to the chassis via a rotatable member that is connected to the hand lever; and
rotation of the hand lever rotates the first and second caster wheels from a first position where the first and second caster wheels are aligned so that the weight on the first and second caster wheels limits the ability of the caster wheels to swivel about the respective swivel axes, to a second position where the first and second caster wheels are aligned so that the first and second caster wheels are freer to swivel about the respective swivel axes.

3. The drifting kart of claim 2, wherein the front steerable wheel is mounted to a zero camber zero rake fork.

4. The drifting kart of claim 3, wherein the front steerable wheel is configured to rotate 360 degrees.

5. The drifting kart of claim 1, wherein the electric motor comprises a variable speed electric motor and the power delivered to the variable speed electric motor is controlled by an acceleration pedal operable by a user.

6. The drifting kart of claim 1, further comprising:
a first fixed wheel and a second fixed wheel connected via an axle;
wherein the hand lever is configured to raise and lower the first and second fixed wheels; and
wherein the casters are mounted to the chassis and the hand lever engages the first and second caster wheels by raising the fixed wheels.

7. The drifting kart of claim 6, wherein the front steerable wheel is mounted to a zero camber zero rake fork.

8. The drifting kart of claim 7, wherein the front steerable wheel is configured to rotate 360 degrees.

9. A drifting kart comprising:
a hollow tube chassis;
a steering mount mounted to the chassis, the steering mount including a front steerable wheel mounted to a zero camber zero rake fork, the front steerable wheel configured to be driven by a variable speed electric motor;
a seat mounted to the chassis, the seat comprising a base that is positioned rearward of the steering mount and below a top of the steering mount;
a battery housing mounted to the chassis, the battery housing including a battery;
wiring configured to provide power from the battery to the variable speed electric motor;
an acceleration pedal connected to a throttle configured to control the power from the battery to the variable speed electric motor;
a plurality of caster wheels mounted to a rear of the chassis via a rotatable member, each of the caster wheel configured to rotate around a respective rotational axis and to swivel around a respective swivel axis; and
a hand lever connected to the rotatable member;
wherein rotation of the hand lever rotates the caster wheels from a first position where the caster wheels are aligned so that the weight on the caster wheels limits the ability of the caster wheels to swivel about the respective swivel axes, to a second position where the caster wheels are aligned so that the caster wheels more freely swivel about the respective swivel axes.

10. The drifting kart of claim 9, wherein the front steerable wheel is configured to rotate 360 degrees.

11. The drifting kart of claim 9, wherein each caster wheel is configured to rotate 360 degrees around the respective rotational axis and swivel 360 degrees around the respective swivel axis.

12. The drifting kart of claim 9, wherein the front steerable wheel has a diameter that is greater than a diameter of the first and second caster wheels.

13. A drifting kart comprising:
a chassis;
a seat mounted to the chassis;
a steering mount mounted to the chassis, the steering mount comprising a front steerable wheel and a steering actuator, the steering actuator configured to be operated by a user, the steering actuator positioned above the front steerable wheel;
a first caster wheel and a second caster wheel mounted to the chassis, the first and second caster wheels configured to rotate around a respective rotational axis and swivel around a respective swivel axis; and
a hand lever configured to engage the first and second caster wheels to induce drifting of the drifting kart.

14. The drifting kart of claim 13, wherein the steering actuator comprises a steering wheel.

15. The drifting kart of claim 13, wherein the steering actuator is positioned directly above the front steerable wheel.

16. The drifting kart of claim 13, wherein the first caster wheel is positioned laterally outward of a lateral side of the seat and the second caster wheel is positioned laterally outward of an opposite lateral side of the seat.

17. The drifting kart of claim 13, wherein the drifting kart is configured to be driven by the steerable front wheel.

18. The drifting kart of claim 17, wherein the steerable front wheel is configured to be driven by an electric motor.

19. The drifting kart of claim 13, wherein the front steerable wheel is on a longitudinal centerline of the drifting kart.

20. The drifting kart of claim 13, wherein the front steerable wheel has a diameter that is greater than a diameter of the first and second caster wheels.

\* \* \* \* \*